United States Patent [19]

DeWoody et al.

[11] Patent Number: 4,560,033

[45] Date of Patent: Dec. 24, 1985

[54] MULTIFUNCTION WHEELCHAIR HANDBRAKE ESPECIALLY ADAPTED FOR RAMP CLIMBING

[75] Inventors: Robert O. DeWoody, Jacksonville; Ralph M. Hollerich, Orlando, both of Fla.

[73] Assignee: Julian C. Renfro, Winter Park, Fla.

[21] Appl. No.: 330,565

[22] Filed: Dec. 14, 1981

Related U.S. Application Data

[63] Continuation of Ser. No. 113,964, Jan. 21, 1980, abandoned, which is a continuation of Ser. No. 914,731, Jun. 12, 1978, abandoned.

[51] Int. Cl.$^4$ .............................................. B60T 1/04
[52] U.S. Cl. .................................. 188/2 F; 188/82.4; 188/82.7; 188/82.8; 280/242 WC; 280/289 WC; 297/DIG. 4
[58] Field of Search ................... 188/2 D, 2 F, 20, 30, 188/74, 72.2, 82.4, 82.7, 82.8, 250 B, 265, 342; 280/211, 242 R, 242 WC, 289 WC; 297/DIG. 4; 192/45.1, 47; 74/533

[56] References Cited

U.S. PATENT DOCUMENTS

| 115,129 | 5/1871 | Spore | 188/82.8 X |
|---|---|---|---|
| 437,449 | 9/1890 | Panter et al. | 188/265 |
| 2,685,351 | 8/1954 | Kromcsak, Jr. | 188/74 X |
| 2,782,870 | 2/1957 | Sill | 188/74 X |
| 2,828,833 | 4/1958 | Civello | 188/82.8 X |
| 3,189,385 | 6/1965 | Mommsen | 297/DIG. 4 |
| 3,216,738 | 11/1965 | Bockus | 297/DIG. 4 |
| 3,556,260 | 1/1971 | Meyer | 188/82.7 X |
| 3,860,094 | 1/1975 | Breton | 188/72.2 X |
| 3,869,146 | 3/1975 | Bulmer | 280/242 WC |

FOREIGN PATENT DOCUMENTS

| 2426629 | 12/1975 | Fed. Rep. of Germany ... 297/DIG. 4 |
|---|---|---|
| 2532485 | 2/1977 | Fed. Rep. of Germany ...... 188/2 F |
| 298502 | 10/1928 | United Kingdom ................. 188/20 |

Primary Examiner—George A. Halvosa
Attorney, Agent, or Firm—Julian C. Renfro

[57] ABSTRACT

A multiposition handbrake for a wheelchair or the like is provided in accordance with this invention, which involves a housing in which an elongate handle is pivotally disposed. A portion adapted to be grasped by the user of the wheelchair is provided above the pivot point of the handle, and a wheel-contacting braking assembly is provided below the pivot point. The housing is provided with a plurality of notches in which a midportion of the handle may be placed. With the notch in which the handle is residing at a given moment determining the relationship of the braking assembly to a wheel of the wheelchair. The wheel-contacting portion includes a toothed pad which may be slidably mounted such that on occasion, a brake-intensification action occurs. When the handle is in the first notch, the teeth are spaced away from the tread portion of the wheel, whereas when the handle is in the second notch, the teeth of the pad have light contact with the tread of the wheel. The arrangement of the pad is preferably such as to inhibit wheel rotation only in one direction, thereby simplifying the efforts of the wheelchair user to ascend a ramp or hill. The handle, when in the third notch, causes said teeth of the pad to forcibly contact the tread of the wheel, and thus provide considerable security to the wheelchair user, in that any rotation of the wheels is effectively prevented.

6 Claims, 14 Drawing Figures

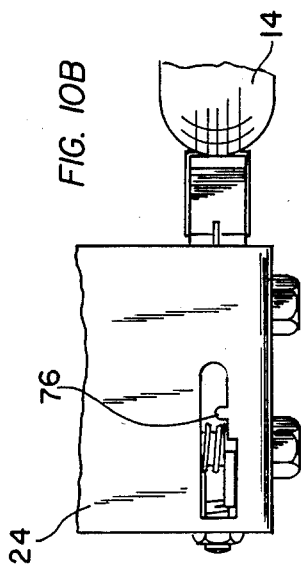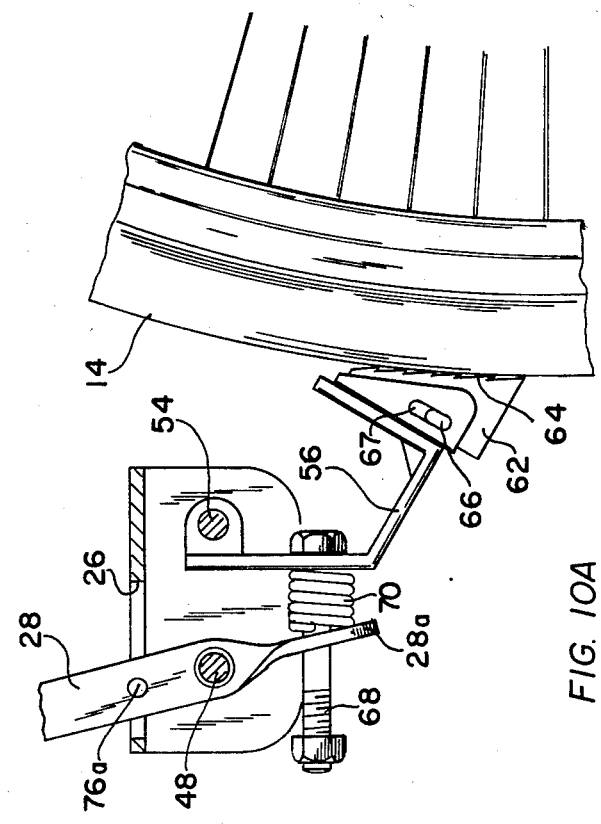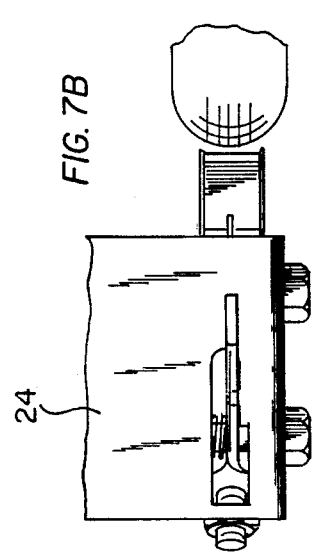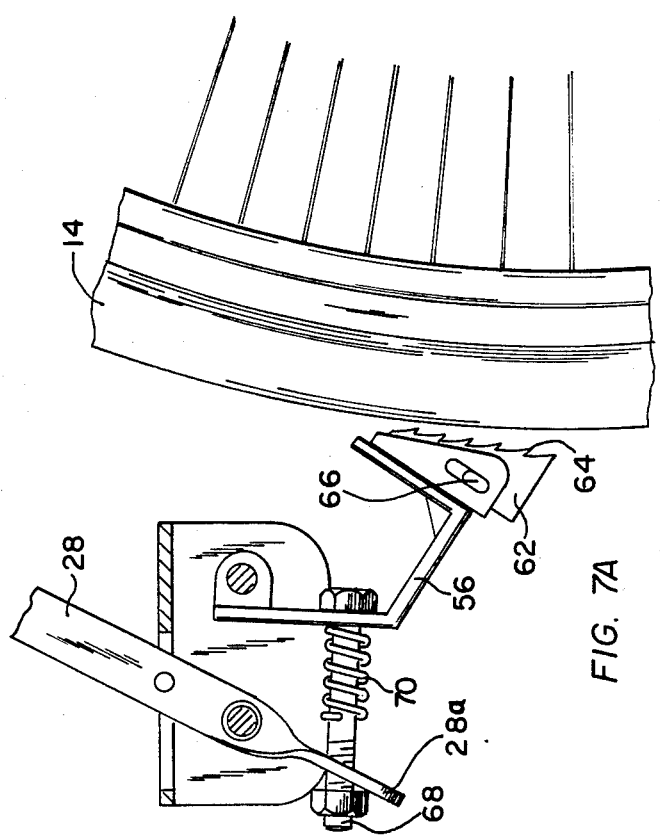

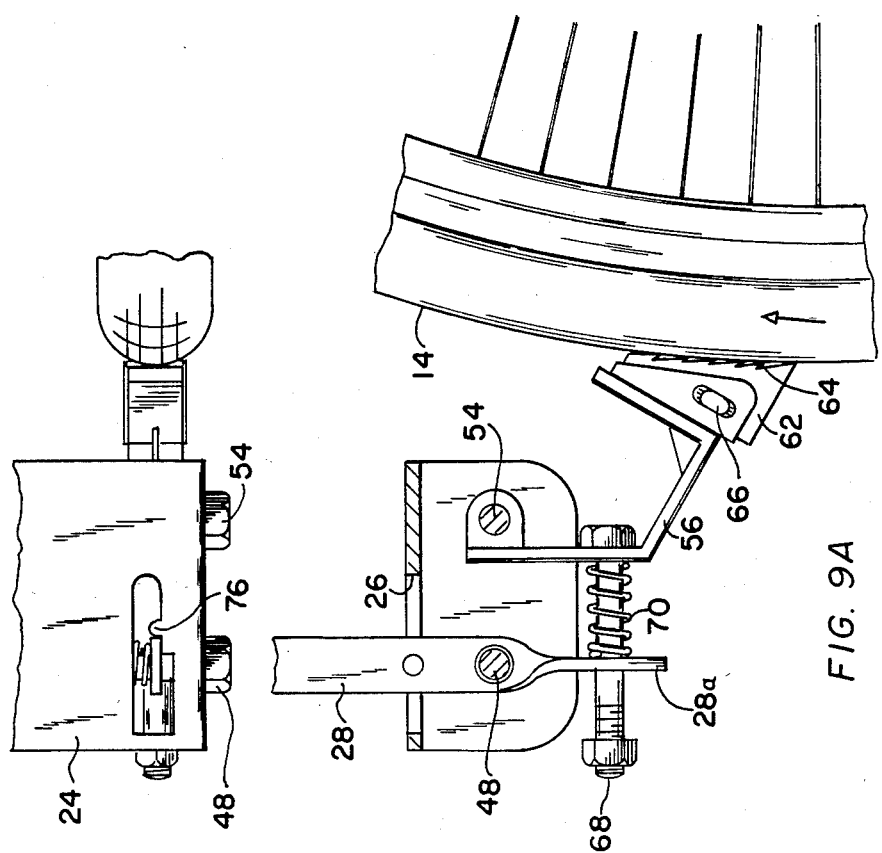
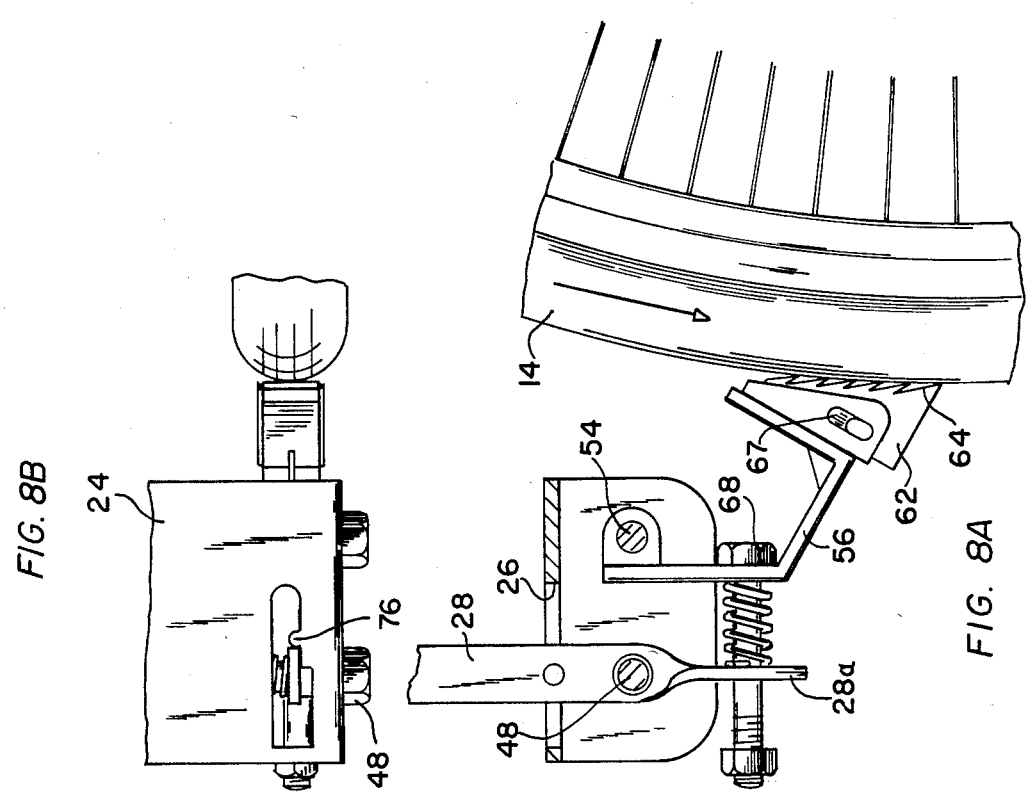

MULTIFUNCTION WHEELCHAIR HANDBRAKE ESPECIALLY ADAPTED FOR RAMP CLIMBING

This is a continuation of application Ser. No. 113,964 filed Jan. 21, 1980, which in turn was a continuation of application Ser. No. 914,731, filed June 12, 1978, both now abandoned.

BACKGROUND OF THE INVENTION

It is well known that almost every wheelchair is equipped with a form of handbrake such that the user can prevent undesirable rolling of the wheelchair. These handbrakes are typically disposed adjacent an upper front portion of each wheel of the wheelchair, and can be separately applied by the user.

The most common type of wheelchair handbrake involves a handle arrangement that utilizes a form of toggle action, and which has two operational positions. When the handle is in one position, the active braking surface is caused to be forced by the toggle action tightly against the tread of the wheel of the wheelchair. When, however, the handle is in its other position, a complete release of the braking action is brought about, with the active braking surface being separated from the associated wheel.

Inasmuch as the brakes in accordance with this type of device were either entirely on or entirely off, they were able to serve no function other than the locking of the wheels, and could not be of assistance to the user of the wheelchair when he or she endeavored to travel up an incline such as a hill or ramp, and likewise could not serve a useful function during descent.

It was to overcome the deficiencies of devices of this type that the present invention was evolved.

SUMMARY OF THE INVENTION

In accordance with this invention, we have created a multiposition handbrake arrangement that may be utilized in a highly advantageous manner with a wheelchair, such that, among other things, the wheelchair occupant may use the handbrakes in the manner of a hill-holder when ascending a hill or ramp.

It is envisioned that our novel handbrake assembly will be operatively mounted adjacent the upper forward portion of each wheel of the wheelchair, with each handbrake assembly having a pivoted handle, upon the lower portion of which, a wheel-contacting member is supported. By suitable manipulation of the handle into various operating positions, the wheel-contacting member is moved into and out of contact with the tread portion of each wheel of the wheelchair.

Each handbrake housing may be equipped with a plurality of notches positioned such that they can contact a midportion of the handle, and when the handle is positioned in a first notch, the associated wheel-contacting portion is spaced away from the respective wheel of the wheelchair, such that no braking effort is applied. When, however, the handle has been positioned in a second notch, a limited amount of contact of the wheel-contacting portion with the tread of the wheel is brought about. As will be described at greater length hereinafter, the wheel-contacting member is a pad designed to have a plurality of pointed teeth, with these teeth having an angularity such that the pointed portions of the teeth inhibit wheel rotation only in one direction.

In accordance with a preferred embodiment of our invention, the teeth of the wheel-contacting portion tend to inhibit wheel rotation only when in the rearward direction. In this way, the teeth present an inconsequential amount of resistance to wheel rotation in a forward direction, yet effectively serve as a hill holder insofar as backward rotation is concerned.

As should thus be apparent, by the use of a pair of our novel devices, the user of a wheelchair is enabled to travel up inclines, such as a ramp or hill, in a manner not previously possible. This is of course because the angled teeth on the wheel-engaging member prevent rearward wheel movement, such that the wheelchair user can momentarily remove his or her hands from the wheels, reposition the hands at an upper rearward portion of the wheels, and then move the wheels incrementally forward up the incline, with this action of course being repeated until such time as the ascent has been completed. This is obviously an arrangement vastly superior to the situation involved in accordance with the prior art, wherein the wheelchair user had to struggle mightily in order to prevent the wheelchair from rolling backward while he was repositioning his hands.

When the handle has been placed in a third notch, this causes the wheel-contacting pad to be forced tightly against the tread surface of the respective wheel, thus preventing motion of the wheel in either direction, and giving the wheelchair user a considerable sense of security.

Though not necessarily required, we may use an arrangement in which the toothed wheel-contacting pad is mounted on pins that are disposed in angled slots. By having the slots disposed at a non-constant radius with respect to the wheel axle. When the wheel of the wheelchair tends to turn in the rearward direction, a brake intensification action takes place. In that the toothed pad becomes more tightly wedged against the tire as the wheel tends to turn in the rearward direction. This action is advantageous even when the handle is in the third operating position, but it has special application to the situation wherein the handle is in the second position, and the handbrake is being used in the manner of a hill-holder.

It is therefore a primary object of this invention to provide a novel and highly satisfactory handbrake for a wheelchair or the like that enables a wheelchair user to ascend or descend a ramp or hill in a much more satisfactory manner than was ever previously possible.

It is another object of our invention to provide a multiposition handbrake in which the operating handle of the brake may be disposed in a position readily permittng wheel rotation in one direction, but inhibiting rotation in the other direction.

It is another object of our invention to provide a three positioned wheelchair handbrake in which a toothed wheel-contacting member is utilized, with the teeth tending to resistively engage the tread of the respective wheel of the wheelchair only when the wheel rotates in a given direction, and at such time to bring about a brake-intensification.

It is still another object of our invention to provide a handbrake of simplified and inexpensive construction that can be incorporated into the construction of a new wheelchair, or alternatively added to a wheelchair that has already been in use.

These and other objects, features and advantages will be more apparent as the description proceeds.

BRIEF DESCRIPTION OF THE DRAWINGS

FIGS. 7a and 7b are related views, depicting the handle in the brake-off position;

FIGS. 8a and 8b are related views depicting the handle in a mid position ideal for ramp climbing, in which the toothed and wheel-contacting pad is permitting forward wheel motion;

FIGS. 9a and 9b are related views depicting the handle in the same position as in FIGS. 8a and 8b, with the toothed pad shown in FIG. 9c effectively resisting any rearward wheel motion;

FIGS. 10a and 10b are related views depicting the handle in the locking position, in which the toothed wheel-contacting pad is pressed tightly against the wheel of the wheelchair.

DETAILED DESCRIPTION

Figure 1:
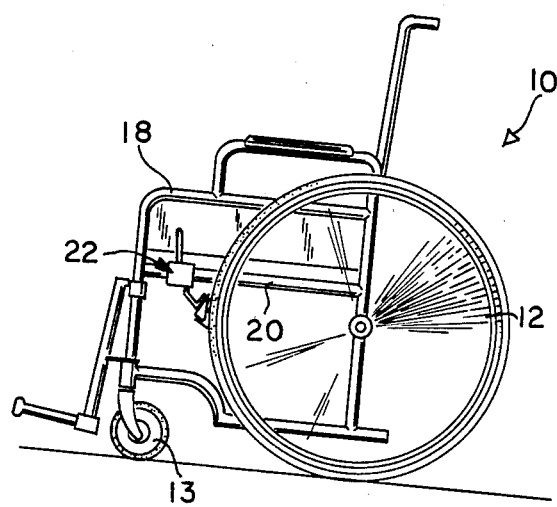
FIG. 1 is a side elevational view, to small scale, of a wheelchair utilizing our novel multiposition brake.

Turning to FIG. 1, it will there be seen that we have depicted a more or less conventional wheelchair 10, which is equipped with a pair of large wheels 12 as well as a pair of small wheels 13. The particular wheel design is of no particular consequence to this invention, although it is presupposed that the user is seated in such a position with respect to the large wheels of the wheelchair that he or she is able to grasp the upper portions of the wheels, or circular handrails disposed closely thereby, and by hand movement propel the wheelchair in the desired direction.

As shown in FIG. 1, the wheelchair frame may be largely constructed of tubular members 18, with a certain horizontal member 20 being utilized in a fore and aft position just above the axle of each wheel. Our novel brake assembly 22 is to be mounted adjacent an upper front portion of each wheel 12 in the manner shown in FIG. 1 and FIG. 2, and for example may be mounted on the fore and aft member 20, or mounted otherwise on the wheelchair if another location is more appropriate.

Figure 2:
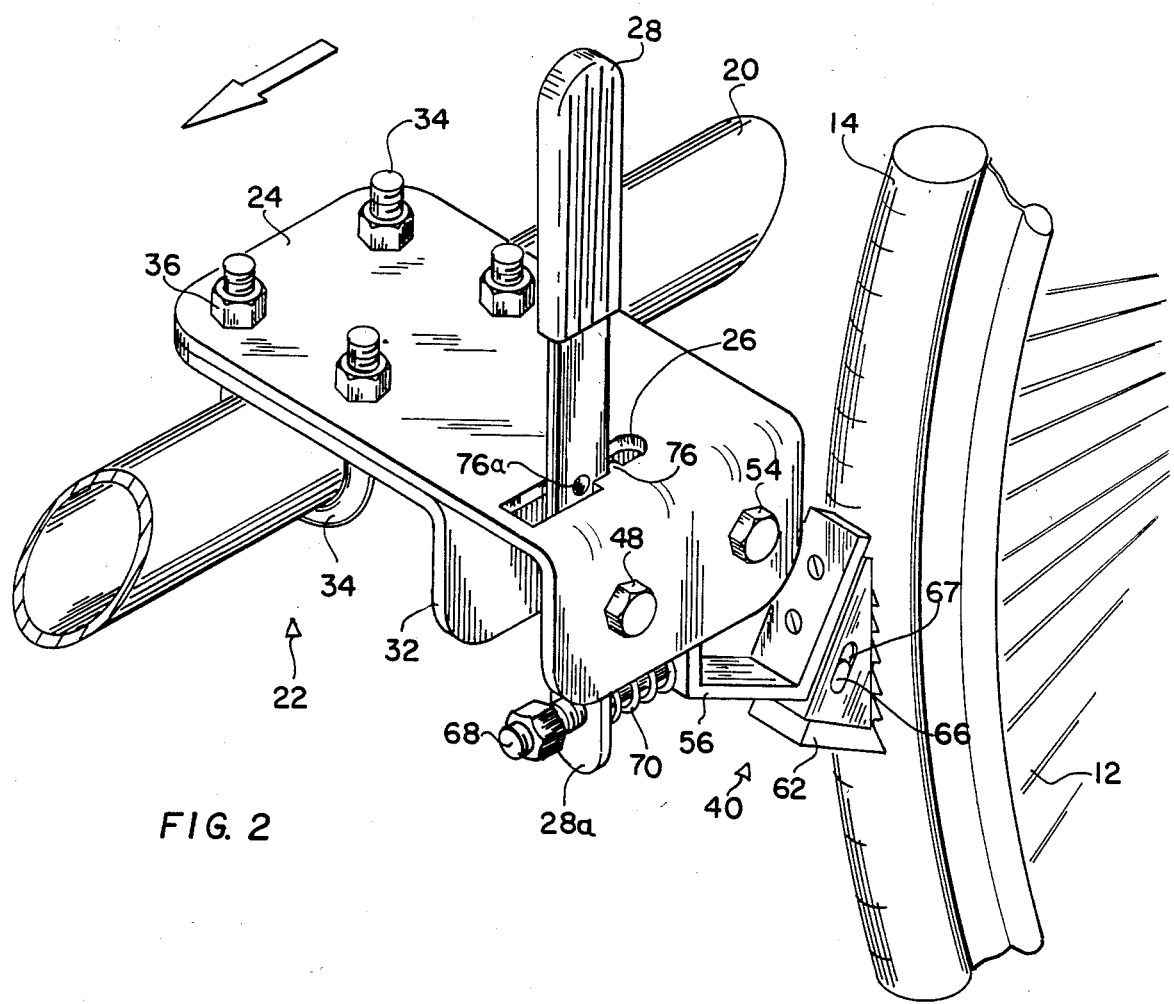
FIG. 2 is a perspective view to a comparatively large scale of our wheelchair brake, in which the wheel-contacting portion is adjacent to the tread of one of the wheels of our wheelchair.

Turning to FIG. 2, it will be seen in greater detail that the brake assembly 22 is principally constituted by an upper plate 24, through an aperture 26 in which, the elongate brake handle 28 extends. Disposed on the underside of the plate 24 is a lower plate 32 of somewhat smaller size, with the ends of these plates nearest the wheel being configured in the manner shown in FIGS. 5 and 6, that is, with these ends being bent downwardly to form portions that are orthogonal to the principal horizontal surfaces of these plates. As will be discussed at greater length hereinafter, these bent over portions of plates 24 and 32 form the handle mounting means.

Figure 5:
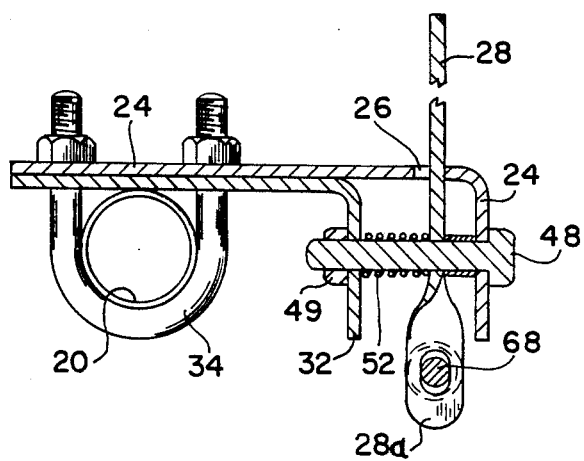
FIG. 5 is a fragmentary view from the front of the brake housing, with portions cut away to show handle-supporting detail.
Figure 6:
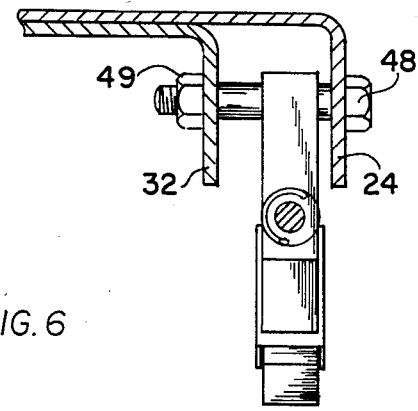
FIG. 6 is a fragmentary view generally similar to FIG. 5.

As perhaps best shown in FIGS. 2 and 5, each brake assembly is secured on the horizontal structural member 20 at the optimum location with respect to the respective wheel 12 by the use of a pair of U-bolts 34, but other arrangements, such as screws passing through the plates 24 and 32 and thence into the structural member 20 could be used if desired. However, a disadvantage of this latter arrangement might be that later adjustments of the handbrake assembly with respect to the associated wheel might not be as easy to bring about as with the use of U-bolts.

Figure 4:
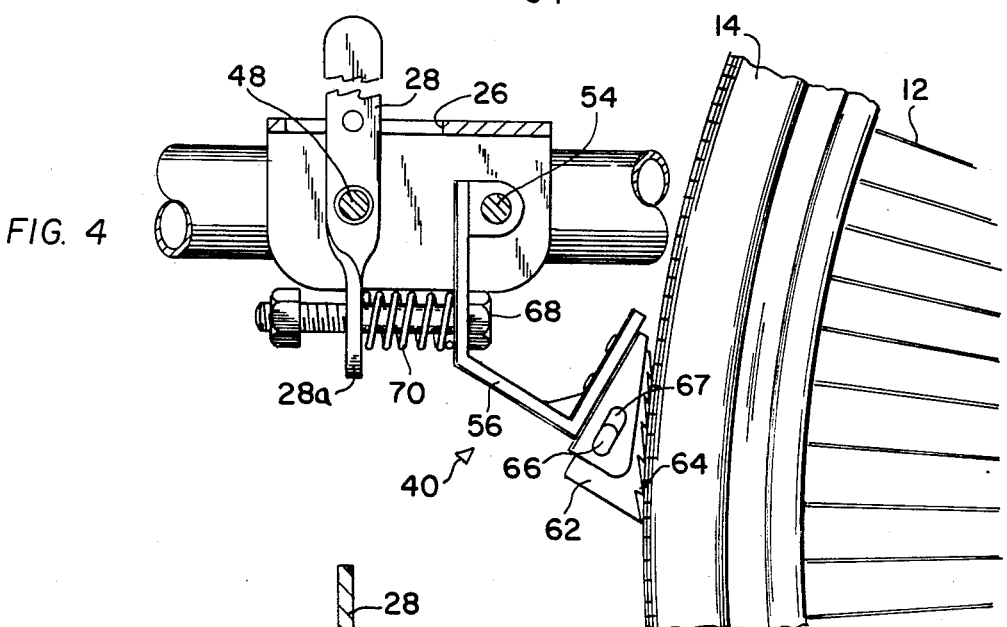
FIG. 4 is a fragmentary side elevational view, showing detail associated with the lower portion of the handle.

In FIGS. 2 and 4 it is to be noted that a braking assembly 40 is provided, which contacts the forward portion of the wheel 12. The force with which each wheel-contacting member contacts the respective wheel is of course determined by manipulation of the handle 28 as will be explained shortly.

Figure 3:
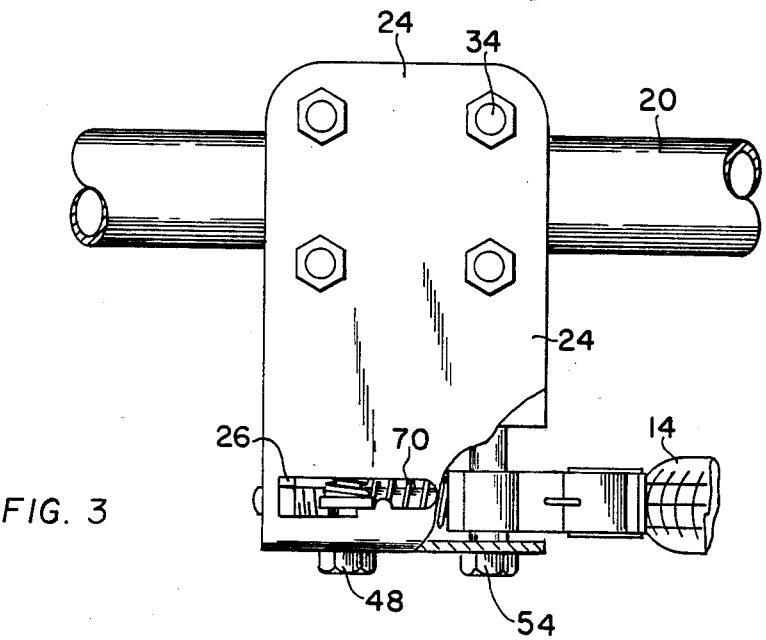
FIG. 3 is a fragmentary top view of our device.

Referring to FIGS. 3 and 4, it will be noted that the handle 28 is mounted in the desired position with respect to the wheel 12 by means of a bolt 48 that passes in the manner shown in FIG. 5 through the downwardly bent portions of plates 24 and 32. This bolt may be provided with a nut 49 located on its innermost portion, but if desired, the remote end of the bolt could threadedly engage a tapped hole located in the turned down portion of the plate 32. As will be noted in FIG. 5, the handle 28 is biased by means of a spring 52 in the direction of the head of bolt 48, for in that way the portion of the handle just above the pivot location is caused to engage certain notched portions located in the slot 26 in the member 24. As will be more apparent as the description proceeds, it is important that the user be able to position the handle in any one of a plurality of positions, and expect it to remain in such position.

Disposed parallel to bolt 48 and residing an inch or two away therefrom is a bolt 54, which is also mounted in the turned down portion of pates 24 and 32; note FIG. 2. The bolt 54 serves as the means for supporting the pivoted portion 56 that is directly associated with the application of braking pressure to the tire 14 of wheel 12. In other words, the wheel contacting portion is disposed on a lower portion of the member 56, with the motion of member 56 about the bolt 54 having the result of increasing or decresing the braking effort applied to the tread portion of the tire 14.

Operative contact between the lower portion 28A of the handle 28 and the adjacent portion of member 56 is made possible by a bolt 68 which extends between 28A and 56. We prefer for either the bolt 68 to be welded to the member 56 or else threadedly disposed therein, such that it will remain in an orthogonal relation to the member 56 throughout its operating range. A slot is provided in handle portion 28A to receive the bolt. Mounted upon the bolt 68 is a compression spring 70 that is of a length to extend between members 28A and 56 and thus provide appropriate contact between these members. As if obvious, if the spring 70 possesses the appropriate amount of stiffness, such will permit the operator to manipulate the handle 28 in the brake applying direction and bring about a desirable amount of braking effort, while on the other hand the spring 70 will permit a desirable non-rigid relation to exist between these members.

It is to be noted in FIG. 4 that the wheel-contacting portion principally involves a pad 62 of rubber or the like, the active face of which is provided with a number of teeth 64 designed to contact the tread portion of the tire 14. The teeth 64 are obviously angled in one direction so that as shown in FIG. 4, the wheel can turn in an uninhibited manner in the counterclockwise direction as viewed in this figure. On the other, hand, the angularity of these teeth is such as to resist rotation in the clockwise direction, which is an important characteristic in that the wheelchair user can utilize this feature to enable him to travel up a hill or ramp without having to combat the tendency of the chair to roll back downwardly.

This braking action can be enhanced by mounting the wheel contacting pad 62 on a pair of oppositely disposed pins 66, with only one of such pins being shown in FIG. 4. Each of these oppositely disposed pins resides in an angled slot 67, with the wheel contacting portion thus being permitted a certain amount of movement in its mounting means. However, it is important to note that the angularity of the pair of slots 67 is such that the slots do not reside at a constant radius with respect to the axle of each wheel 12. This is because should the wheel 12 tend to turn in the rearward direction, which is clockwise as shown in FIG. 4, upon the teeth 64 resisting wheel rotation, the toothed pad 62 is forced upwardly, which causes the oppositely disposed pins 66 to travel upwardly in their respective angled slots. As a result, a type of wedging action is brought about that intensifies the braking effort, and most satisfactorily prevents the wheelchair from rolling rearwardly. It is to be noted that this brake intensification action is not only true insofar as the hill climbing aspect of our invention is concerned, but also it plays a part in assuring a strong braking action when the user desires to entirely prevent any rotation of the wheels 12.

Turning now to the several small related views, it is to be noted in FIGS. 7a and 7b that the handle 28 has been moved into what may be regarded as the first position, in which position it is maintained by virtue of its interrelationship with the protrusion 76 located in the slot 26. As depicted in FIG. 7A, the wheel contacting member 62 in this instance is spaced away from the tread portion of the tire 14, which of course means that the brake offers no resistance whatever to the rolling motion of the wheel 12. The user would ordinarily place each of the handles 28 of his wheelchair in this first position when he or she is travelling over substantially level ground, and no braking effort is desired. A small hole 76A can be used in the handle if desired, which can be placed in coincidence with protrusion 76 if it is desired to hold the handle in a brakes-off position.

Reference to FIGS. 8A and 8B reveals the handle 28 in its second position, which is one in which the teeth 64 of the tire contacting pad 62 are in relatively light contact with the periphery of the tire 14. The angularity of the teeth and of the pair of slots 67 are such as not to inhibit the motion of the wheel 12 in the forward or counterclockwise direction and the arrow in FIG. 8A is intended to connote that this arrangement readily permits forward motion of each wheel of the wheelchair. As should be clear, the wheelchair user would maintain the handle 28 in the second position at such time as he is either ascending or descending a hill or ramp. This is becuse not only does it provide a hill-holding action during ascent, but also during descent, the user can move the handle quickly from a position in which only light tire pressure is involved, into a position in which a considerable braking effort is brought about, and in this latter instance such permits the user to selectively apply braking effort to each handle 28 as needed in order for the wheelchair to descend an inclined surface at a desired speed and in the desired direction.

Related FIGS. 9a and 9b reveal the handle 28 in the same second position, but with the wheel 12 tending to turn in the rearward direction, as connoted by the clockwise arrow. As previously explained, motion of the wheel in this direction causes the tire tread 14 to engage the sharp edges of the teeth 64, and tends to cause movement of the wheel contacting pad 62 in the upward direction. An intensification of the braking effort is brough about by the angularity of the slots 67, for in traveling even a slight distance in the direction of reverse wheel rotation, the pins 66 upon which the wheel contacting pad 62 is mounted travel in the angled slots in a wedging direction, thus, increasing the force of contact wwith the tire, and bringing about an effective prevention of wheel rotation in the undesired direction.

FIGS. 10a and 10b reveal the handle 28 in the third position, which is the position in which the compression spring 70 is forcefully compressed. As a result of this arrangement, the teeth 64 engage the tread of the tire quite strongly, so much so that the teeth tend to distort. As a result, the wheels 12 are in effect locked, and wheelchair motion can be effected only with the tires skidding upon their mounting surface.

It is therefore to be seen that we have provided a highly effective yet inexpensive multiposition brake for a wheelchair, which may either be manufactured as part of a wheelchair, or else latter added thereto.

We claim:

1. A multiposition handbrake for a wheelchair or the like comprising a housing, a handle member pivotally mounted in said housing and having an upper portion and a lower portion, said upper portion being adapted to be grasped by the user of the lwheechair, said housing being adapted to be mounted adjacent the tire of a wheel of the wheelchair and said handle having a plurality of operating positions, a wheel-contacting assembly pivotally mounted in said housing, said wheel-contacting assembly supporting a pad adapted to be operatively disposed adjacent the tread of the tire, said pad having a plurality of pointed teeth, with said teeth possessing considerable angularity, a lower portion of said handle member being operatively connected to said pivotally mounted wheel-contacting assembly, said handle, when in a first position in said housing, causing no movement of the pad into contact with the tread of the tire, the lower portion of said handle, when said handle has been moved by the user to an intermediate position in said housing, causing a corresponding movement of said wheel-contacting member such that the teeth of said pad have comparatively light touching contact with the tread of the tire, the angularity of said teeth at such time permitting forward rotation of the wheel, with rotation in the reverse direction being inhibited, said handle, when moved to a third position in said housing, causing said pad to forcibly contact the tread of the tire, thereby firmly preventing any rotation of that wheel of the wheelchair, said toothed pad being mounted by the use of a pair of opposed pins disposed in angled slots located in said wheel-contacting assembly, the sidewalls of said slots being disposed at non-constant radius with respect to the axis of rotation of the wheel, said pad, when its teeth are in firm engagement with the tread of the tire, being caused by wheel rotation in a certain direction to move such that its pins travel in a pad-wedging direction in their slots, thereby bringing about an intensification of braking effort.

2. A multiposition handbrake for a wheelchair or the like comprising a housing, a handle member pivotally mounted in said housing and having an upper portion and a lower portion, said upper portion being adapted to be grasped by the user of the wheelchair, and said lower portion being operatively associated with a wheel-contacting assembly, said housing being adapted to be mounted adjacent the tire of a wheel of the wheelchair and said handle having a plurality of operating positions, said handle member being movable only in a single direction during the application of a braking effort, with brake release entailing handle movement in the opposite direction, said wheel-contacting assembly supporting a pad adapted to be operatively disposed adjacent the tread of the tire, said pad having a plurality of pointed teeth, with said teeth possessing considerable angularity, said handle, when in a first position in said housing, causing no movement of said pad into contact with the tread of the tire, said handle, when moved by the user in the brake application direction to an intermediate position in said housing, causing a corresponding movement of said wheel-contacting member such that the teeth of said pad have comparatively light touching contact with the tread of the tire, the angularity of said teeth at such time permitting forward rotation of the wheel, with rotation in the reverse direction being inhibited, said handle, when moved to a third position in said housing, causing said pad to forcibly contact the tread of the tire, thereby firmly preventing any rotation of that wheel of the wheelchair, whereby when said handle has been moved to said intermediate position, the wheelchair user is enabled to climb a ramp without the wheelchair tending to roll backward during the repositioning of the user's hands.

3. A multiposition handbrake for a wheelchair or the like comprising a housing, a pivoted, elongate handle operatively mounted in said housing and having three distinct operative positions, said handle being movable only in a single direction during the application of braking effort, an upper part of said handle involving a portion adapted to be grasped by the user of the wheelchair, and a lower part of said handle, below the pivot point thereof, interconnected with a wheel-contacting assembly, with a relatively stiff spring being utilized in said interconnection, said wheel-contacting assembly utilizing a pad equipped with a plurality of pointed teeth possessing considerable angularity, with the points of said teeth being in a direction to oppose rearward rotation when brought into contact with the tread of a tire of the wheelchair, said wheel-contacting assembly being movable in response to handle movement so as to place said toothed pad into or out of contact with the tread of the tire, said handle, when in a first position, causing said toothed pad to be spaced from the tread of the tire, and when moved in the brake application direction to an intermediate position in said housing, causing said wheel-contacting assembly to move such that said pointed teeth have comparatively light touching contact with the tread of the tire, such that wheel rotation in the forward rotative direction is permitted as a result of tooth angularity, but in the other direction prevented, said handle, when moved in the brake application direction to a third position, causing said toothed pad to forcibly contact the tread of the tire, thereby firmly preventing any rotation of the wheel of the wheelchair, whereby said handle, when in its intermediate position, enables a wheelchair user to avoid undesired wheel rotation during the repositioning of his hands.

4. The multiposition handbrake as defined in claim 3 in which said toothed pad is mounted by the use of a pair of opposed pins disposed in angled slots located in said wheel-contacting assembly, the sidewalls of said slots being disposed at non-constant radius with respect to the axis of rotation of the wheel, said toothed pad, when its teeth are in firm engagement with the tread of the tire, being caused by wheel rotation in a certain direction to move such that its pins travel in a pad-wedging direction in their slots, thereby bringing about an intensification of braking effort.

5. A multiposition handbrake for a wheelchair or the like utilizing a handle movable only in a single direction during the application of a braking effort, said handbrake comprising a housing having means such that it can be mounted adjacent the wheel of a wheelchair, an elongate handle pivotally disposed in said housing, an upper portion of said handle involving a portion adapted to be grasped by the user of the wheelchair, and a portion below the pivot being in operative connection with a wheel-contacting assembly, said operative connection including the use of a relatively stiff spring, said housing having a plurality of notches adjacent a portion of the handle above the pivot point, into any one of which notches the handle may be selectively placed on occasion, said wheel-contacting assembly utilizing a toothed pad adapted to be operatively disposed closely adjacent the tread of a tire of the wheelchair, said toothed pad having a plurality of pointed teeth, with said teeth having considerable angularity, said toothed pad being movable on occasion by the user into or out of contact with the tread of the tire as a result of handle manipulation, said handle, when in a first of said notches, causing the teeth of said pad to be spaced from the tread of the tire, said handle, when moved in the brake application direction and placed in a second notch, causing the teeth of said pad to have comparatively light touching contact with the tread of the tire such that as a result of the angularity of said teeth, the wheel can rotate only in the forward direction, with rotation in the reverse direction being inhibited, said handle, when moved in the brake application direction and placed in a third of said notches, causing said teeth to forcibly contact the tread of the tire, thereby firmly preventing any rotation of that wheel of the wheelchair, whereby when said handle has been placed in said second notch, the wheelchair user is enabled to climb a slope without the wheelchair tending to roll backward during the repositioning of the user's hands.

6. The multiposition handbrake as defined in claim 5 in which said toothed pad is mounted by the use of a pair of opposed pins disposed in angled slots located in said wheel-contacting assembly, the sidewalls of said slots being disposed at non-constant radius with respect to the axis of rotation of the wheel, said pad, when its teeth are in firm engagement with the tread of the tire, being caused by wheel rotation in a certain direction to move such that its pins travel in a pad-wedging direction in their slots, thereby bringing about an intensification of braking effort.

* * * * *